(12) United States Patent
Klomsdorf et al.

(10) Patent No.: US 7,907,671 B2
(45) Date of Patent: Mar. 15, 2011

(54) METHOD AND SYSTEM FOR SCALING A MULTI-CHANNEL SIGNAL

(75) Inventors: Armin W. Klomsdorf, Libertyville, IL (US); Michael J. Carney, Libertyville, IL (US); Joseph F. Cramer, III, Woodstock, IL (US); Christopher P. LaRosa, Crystal Lake, IL (US); Dale G. Schwent, Schaumburg, IL (US); Robert S. Trocke, Caledonia, WI (US)

(73) Assignee: Motorola Mobility, Inc., Libertyville, IL (US)

( * ) Notice: Subject to any disclaimer, the term of this patent is extended or adjusted under 35 U.S.C. 154(b) by 1616 days.

(21) Appl. No.: 11/003,247

(22) Filed: Dec. 3, 2004

(65) Prior Publication Data
US 2006/0120480 A1 Jun. 8, 2006

(51) Int. Cl.
H04K 1/10 (2006.01)
(52) U.S. Cl. .......................................... 375/260
(58) Field of Classification Search .................. 375/285, 375/295, 296, 260, 267; 455/63.1, 114.2, 455/114.3
See application file for complete search history.

(56) References Cited

U.S. PATENT DOCUMENTS

| | | | |
|---|---|---|---|
| 5,265,119 A | 11/1993 | Gilhousen et al. | |
| 5,485,486 A | 1/1996 | Gilhousen et al. | |
| 5,497,395 A | 3/1996 | Jou | |
| 5,644,591 A | 7/1997 | Sutton | |
| 5,799,005 A | 8/1998 | Soliman | |
| 5,805,643 A | 9/1998 | Seki et al. | |
| 5,809,061 A | 9/1998 | Shea et al. | |
| 5,881,368 A | 3/1999 | Grob et al. | |
| 5,901,178 A | 5/1999 | Lee et al. | |
| 5,930,230 A | 7/1999 | Odenwalder et al. | |
| 5,930,299 A | 7/1999 | Vannatta et al. | |
| 6,031,431 A * | 2/2000 | Vinekar | 332/103 |
| 6,298,051 B1 | 10/2001 | Odenwalder et al. | |
| 6,424,678 B1 * | 7/2002 | Doberstein et al. | 375/260 |
| 6,434,135 B1 * | 8/2002 | Ozluturk et al. | 370/342 |
| 6,526,102 B1 * | 2/2003 | Piirainen | 375/297 |
| 6,570,929 B1 * | 5/2003 | Eriksson | 375/260 |
| 6,677,870 B2 * | 1/2004 | Im et al. | 341/110 |
| 6,810,027 B1 * | 10/2004 | Posti | 370/311 |
| 6,982,972 B1 * | 1/2006 | Hirata | 370/335 |
| 6,999,523 B2 * | 2/2006 | Posti | 375/296 |
| 7,023,897 B2 * | 4/2006 | Kurihara | 375/130 |
| 7,065,154 B2 * | 6/2006 | Ylamurto | 375/296 |
| 7,194,022 B2 * | 3/2007 | Honkanen et al. | 375/216 |
| 2003/0053552 A1 * | 3/2003 | Hongo et al. | 375/295 |
| 2003/0063683 A1 | 4/2003 | MacFarlane Shearer, III et al. | |
| 2004/0008795 A1 * | 1/2004 | Chu et al. | 375/260 |
| 2005/0008094 A1 * | 1/2005 | Kramer et al. | 375/296 |

FOREIGN PATENT DOCUMENTS

| | | |
|---|---|---|
| EP | 1531557 A2 | 4/2004 |
| EP | 1531557 A3 | 4/2004 |
| EP | 1217759 B1 | 3/2006 |
| WO | WO 00/10265 | 2/2000 |
| WO | 0018002 | 3/2000 |

* cited by examiner

Primary Examiner — Khanh C Tran

(57) ABSTRACT

A communication unit is provided having a transmitter and a processor (103). The processor (103) receives information (105) representative of a configuration of physical channels (107). The processor (103) determines a scaling factor responsive to the information (105) and facilitates scaling a signal (109, 111) provided by a combination of the channels utilizing the scaling factor. The scaled signal (109, 111) is provided to the transmitter.

17 Claims, 4 Drawing Sheets

METHOD AND SYSTEM FOR SCALING A MULTI-CHANNEL SIGNAL

FIELD OF THE INVENTION

The present invention relates in general to wireless communication units and wireless networks, and more specifically to scaling a multi-channel signal.

BACKGROUND OF THE INVENTION

A signal utilized in a transmitter, for example in a cellular telephone handset, is processed through various components that make up the transmitter before being transmitted. An average amplitude of the signal can vary widely, which in general affects the power and ultimately the quality of the signal that is sent over the transmitter.

In a transmitter of a handset utilizing, for example, wideband code division multiple access (WCDMA), the signal encompasses several physical channels at the physical layer of processing. The physical channels are combined in an orthogonal fashion and encoded to form a single complex data stream. The complex data stream is conventionally further processed by components in the transmitter, for example, pulse shaping and is further processed by a digital-to-analog converter (DAC) to form an analog signal that will transmitted over the transmitter.

The variation in the average amplitude of the signal can sometimes be quantified as an RMS (root mean square) level of the signal. To improve transmitter noise and carrier feed through performance, and hence the quality of the signal, the signal should be adjusted so that it covers the limits of the components in the transmitter, e.g., a digital-to-analog converter (DAC), without clipping of the signal.

For a typical channel configuration in accordance with various conventional standards, the variation in the signal due to channel configuration can be limited to 3 dB when measuring the RMS (root mean square) level. For example, under the standards established by the 3GPP (3rd Generation Partnership Project) Release 99/Release 4 in accordance with conventional practice, the variation in the RMS level of the signal is about 3 dB worst case. This is an amount that can be sufficiently absorbed in a line-up of components in a typical transmitter. Moreover, this amount does not tend to add an undue performance burden on other radio frequency integrated circuits, such as a modulator, voltage controlled amplifier or power amplifier, that are typically included in the line-up of components.

The addition, however, of the high speed dedicated physical control channel (HS-DPCCH), required for high speed downlink packet access (HSDPA) in accordance with the 3GPP (3rd General Partnership Project) Release 5, allows the variation in the RMS level of the signal to be about 8 to 9 dB worst case. This amount of variation is not efficiently absorbed in the line-up of components. Further releases may add additional channels, e.g., for HSUPA (high speed uplink packet access) which will likely result in further RMS level variation.

Conventional techniques provide for a fixed scaling of the signal, where the signal is simply scaled up; usually such scaling is limited so that the maximum amplitude signal that is expected is not clipped at the digital-to-analog converter (DAC) component. In conventional techniques, however, a signal having a minimum amplitude under normal operating conditions will have suboptimal signal levels that are well below the maximum that can be supported in the DAC components.

Unfortunately, with suboptimal signal levels driving the radio frequency modulator, the carrier feed through and radio frequency signal-to-noise ratio of the modulator tend to be degraded approximately dB for dB. The components included in the radio frequency circuitry of a conventional line-up of components can incur significant additional complexity to allow for carrier feed through mitigation and current drain for noise improvements, so that the overall transmitter system can comply with minimum standards.

BRIEF DESCRIPTION OF THE DRAWINGS

The accompanying figures where like reference numerals refer to identical or functionally similar elements and which together with the detailed description below are incorporated in and form part of the specification, serve to further illustrate various exemplary embodiments and to explain various principles and advantages in accordance with the present invention.

DETAILED DESCRIPTION

Figure 1:
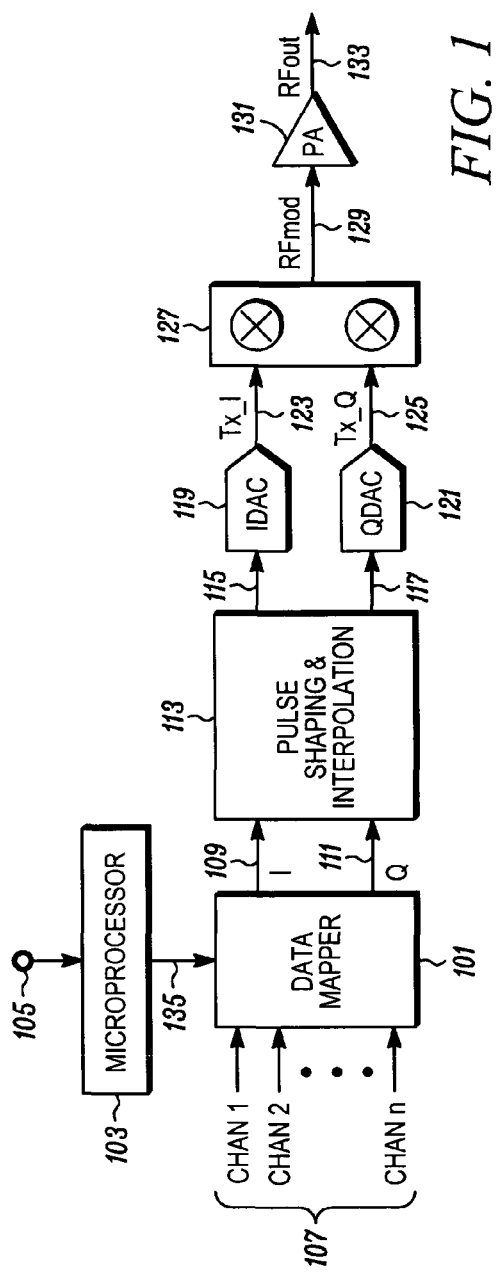
FIG. 1 is a system block diagram illustrating exemplary simplified and representative radio frequency transmitter components associated with a communication unit in accordance with various exemplary embodiments.

In overview, the present disclosure concerns wireless communications devices or units, often referred to as communication units, such as cellular phone or two-way radios and the like having a transmitter and corresponding components. Such communication units can be associated with a communication system such as an Enterprise Network, a cellular Radio Access Network, or the like. Such communication systems may further provide services such as voice and data communications services. More particularly, various inventive concepts and principles are embodied in systems, communication units, components therefore, and methods therein for leveling a signal associated with a transmission from a communication unit.

It should be noted that the term communication unit may be used interchangeably herein with subscriber unit, wireless subscriber unit, wireless subscriber device or the like. Each of these terms denotes a device ordinarily associated with a user and typically a wireless mobile device that may be used for transmissions in connection with a public network, for example in accordance with a service agreement, or within a private network such as an enterprise network. Examples of such units include personal digital assistants, personal assignment pads, and personal computers equipped for wireless operation, a cellular handset or device, equivalents thereof, and the like.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

As further discussed herein below, various inventive principles and combinations thereof are advantageously employed to reduce the problems associated with or caused by wide variations in the level of a signal.

Further in accordance with exemplary embodiments, a signal that is to be transmitted over a transmitter can be digitally scaled in accordance with different channel configurations to a preferred signal level. In overview, consider, for example, a wideband code division multiple access (WCDMA) transmitter. A signal that is to be transmitted comprises several physical channels that are combined in an orthogonal manner, and encoded to form a single complex data stream. The configuration of the channels that comprise the signal are input, and the signal is scaled as necessary to achieve a substantially constant RMS signal value.

Referring now to FIG. 1, a system block diagram illustrating exemplary simplified and representative radio frequency transmitter components associated with a communication unit in accordance with various exemplary embodiments will be discussed and described. Generally, digital signals (representing the signal that is to be transmitted) are provided on channels 107 which are input into a data mapper 101. A microprocessor 103 can provide a control signal 135 to the data mapper 101. The data mapper 101 can perform various functions including combining the signals input from the channels and can provide one or more output signals that are further processed by other components in accordance with known techniques. A more detailed explanation of the microprocessor 103, the data mapper 101, and associated signals are provided below. In the illustrated example, the output signals are a first in-phase (I) output signal 109 and a first quadrature (Q) output signal 111.

The first in-phase output signal 109 can be further processed by conventional in-line components, e.g., a pulse shaping and interpolation component 113 can provide a second in-phase output signal 115, an in-phase digital-to-analog converter component 119 can provide a transmit in-phase (Tx_I) modulation signal 123, which can be provided to a radio frequency (RF) modulator 127 component. The first quadrature output signal 111 similarly can be further processed by conventional in-line components, e.g., the pulse shaping and interpolation component 113 providing a second quadrature output signal 117, a quadrature digital-to-analog converter component 121 providing a transmit quadrature (Tx_Q) modulation signal 125, which can be provided to the radio frequency (RF) modulator component 127. The RF modulator component 127 can combine the Tx_Q signal 125 and the Tx_I signal 123 and can output an RF modulated signal 129 to a power amplifier component 131, which can provide an RF output signal 133. These conventional in-line components are well understood in the art and will not be further described. In addition, it will be understood that the exemplary quadrature components can be equivalently represented in other techniques, e.g., in polar (magnitude/phase) components.

The data mapper 101 and the microprocessor 103 will now be explained in more detail. Data is provided for transmission, and can be originated from, e.g., a communication to be transmitted (e.g., voice, image, etc.) in accordance with known techniques. In a WCDMA transmitter, the data is provided as signals on two or more physical channels 107 that can be combined in a known, for example, orthogonal manner, and encoded to form a single complex data stream for transmission.

Each of the n channels 107 represented in FIG. 1 can be weighted by a gain factor. The weight factor (sometimes referred to as a Beta-gain) can be provided by a network infrastructure device, or could be determined locally. In operation, typically, one of the physical channels 107 is at a maximum Beta-gain level, while other physical channels 107 tend to be significantly scaled back. In accordance with one or more embodiments used in connection with a communication device, the weight factor that is to be applied to each channel can be conventionally determined by a network infrastructure device and has previously been received by the communication device. The weight factor or weights or Beta-gains generally correspond to the relative transmitter power devoted to or applied to the respective channels. The signals provided on the channels 107 can be input into the data mapper 101, which can apply, e.g., conventional scrambling and spreading techniques. If the signals from the physical channels 107 would not be scaled (as in, e.g., a conventional device), the resulting waveforms of the I and Q channels 109, 111 output from the data mapper 101 could be well below a desired signal level for certain channel configurations.

If the scaling applied to signals on the I and Q channels 109, 111 before the digital-to-analog converters makes use of their full range, signal quality can be maintained at a high level for a variety of channel configurations. The number of channels and the weight of signals on each channel can vary. A detailed discussion touching on channel variation is provided in connection with FIG. 4-FIG. 6. Various information regarding the channels, including the configuration of the channels and weighting of each channel, is conventionally stored, and updated, typically from a transmission generated by a network infrastructure device.

In accordance with standards, certain of the configuration information, such as the Beta-gain values, can be input to the data mapper 101. Information regarding the configuration of the plurality of channels can include the number of channels, and a weighting for each channel (e.g., a Beta-gain corresponding to each channel) as well as a spreading factor for each channel. Moreover, one or more channels can be set to have a variable weighting. For example, the weighting can vary depending on the particular type of data or message, e.g. an "Acknowledgment" (ACK), "No Acknowledgment" (NACK) of payload data on a downlink channel, or channel quality indication (CQI) message. Typically ACK and NACK messages are given heavier weighting than the CQI messages although system operators have flexibility in establishing these relative weights. Thus each channel may have unique configuration information. A signal 105 providing the configuration information and Beta-gain values can be received by or provided to the microprocessor 103 in a known manner.

In accordance with one or more embodiments, the weighting that is utilized by the data mapper 101, can be scaled by the microprocessor 103 before being provided to the data mapper 101. (Scaling is discussed in more detail below.) The data mapper 101 can then perform various functions including combining the signals on the channels 107 and can provide one or more output signals. One of the standard functions that can be provided in the data mapper 101 can utilize the Beta-gain values to determine signals output from the data mapper 101.

The illustrated embodiment employs direct scaling of the Beta-gain values themselves that are input to the data mapper 101. This approach may be subject to error vector magnitude (EVM) degradation and code domain errors if an insufficient number of bits is used to represent the Beta-gains.

Figure 2:
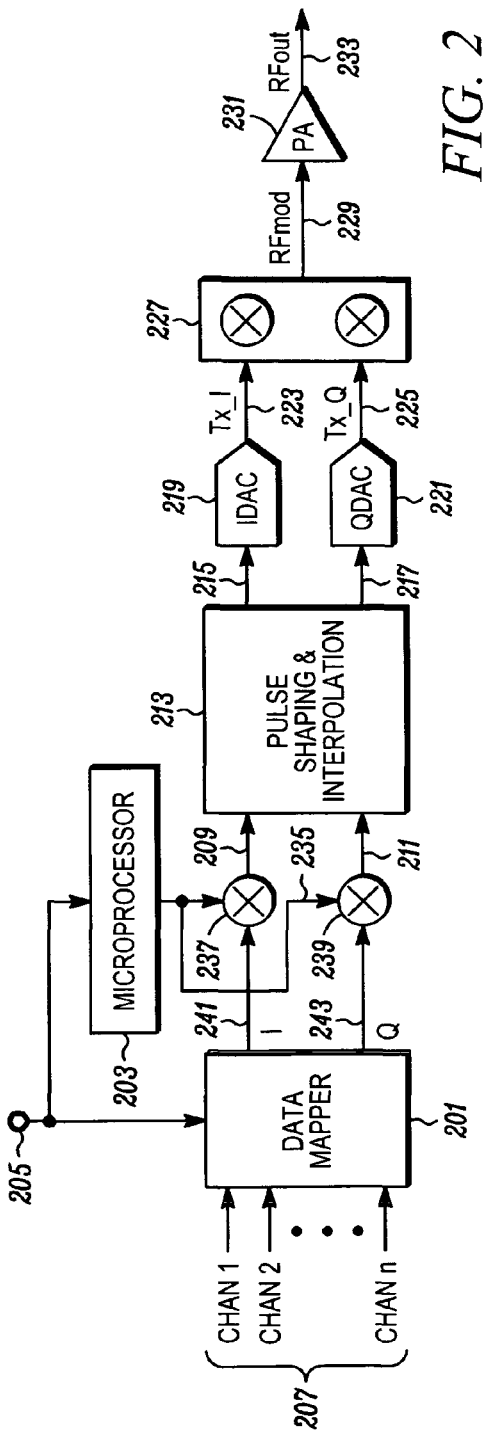
FIG. 2 is a system block diagram illustrating exemplary simplified and representative radio frequency transmitter components associated with a communication unit in accordance with alternative exemplary embodiments.

Referring now to FIG. 2, a system block diagram illustrating exemplary simplified and representative radio frequency transmitter components associated with a communication unit in accordance with alternative exemplary embodiments will be discussed and described. Where components are similar to those illustrated in FIG. 1, a description thereof will be brief or omitted for the sake of simplicity.

Generally, signals provided on channels 207 are input into a data mapper 201. Further, the data mapper receives signals 205 including a weighting or gain factor, which are applied to the digital signals in accordance with known techniques, e.g., as specified in various 3GPP standards. The data mapper 201 outputs a first in-phase (I) output signal 241 and a first quadrature (Q) output signal 243.

A microprocessor 203 can determine a scaling factor, and can provide a control signal corresponding to the scaling factor, e.g., an IQ scale signal 235, which can be used by an in-phase scale multiplier 237 and a quadrature scale multiplier 239, to scale the first in-phase output signal 241 and the first quadrature output signal 243, providing a scaled in-phase signal 209 and a scaled quadrature signal 211. The scaling that is applied can be synchronized with the signals received at the multipliers 237, 239 so that the scaling corresponds to the proper signal. The determination of the scaling factor can utilize, e.g., the Beta-gain values of the n physical channels 207, which are known to the system well in advance of the determination. Determining the scaling factor is described in more detail below.

The scaled in-phase signal 209 can be further processed by conventional in-line components, e.g., a pulse shaping and interpolation component 213 providing a second in-phase output signal 215, an in-phase digital-to-analog converter 219 component providing a Tx_I signal 223 to a radio frequency (RF) modulator component 227. The scaled quadrature signal 211 similarly can be further processed by conventional in-line components, e.g., the pulse shaping and interpolation component 213 providing a second quadrature output signal 217, a quadrature digital-to-analog converter component 221 providing a Tx_Q signal 225 to the radio frequency (RF) modulator component 227. The RF modulator component 227 can combine the Tx_Q signal 225 and the Tx_I signal 223 and output an RF modulated signal 229 to a power amplifier 231, which can provide an RF output signal 233.

Figure 3:
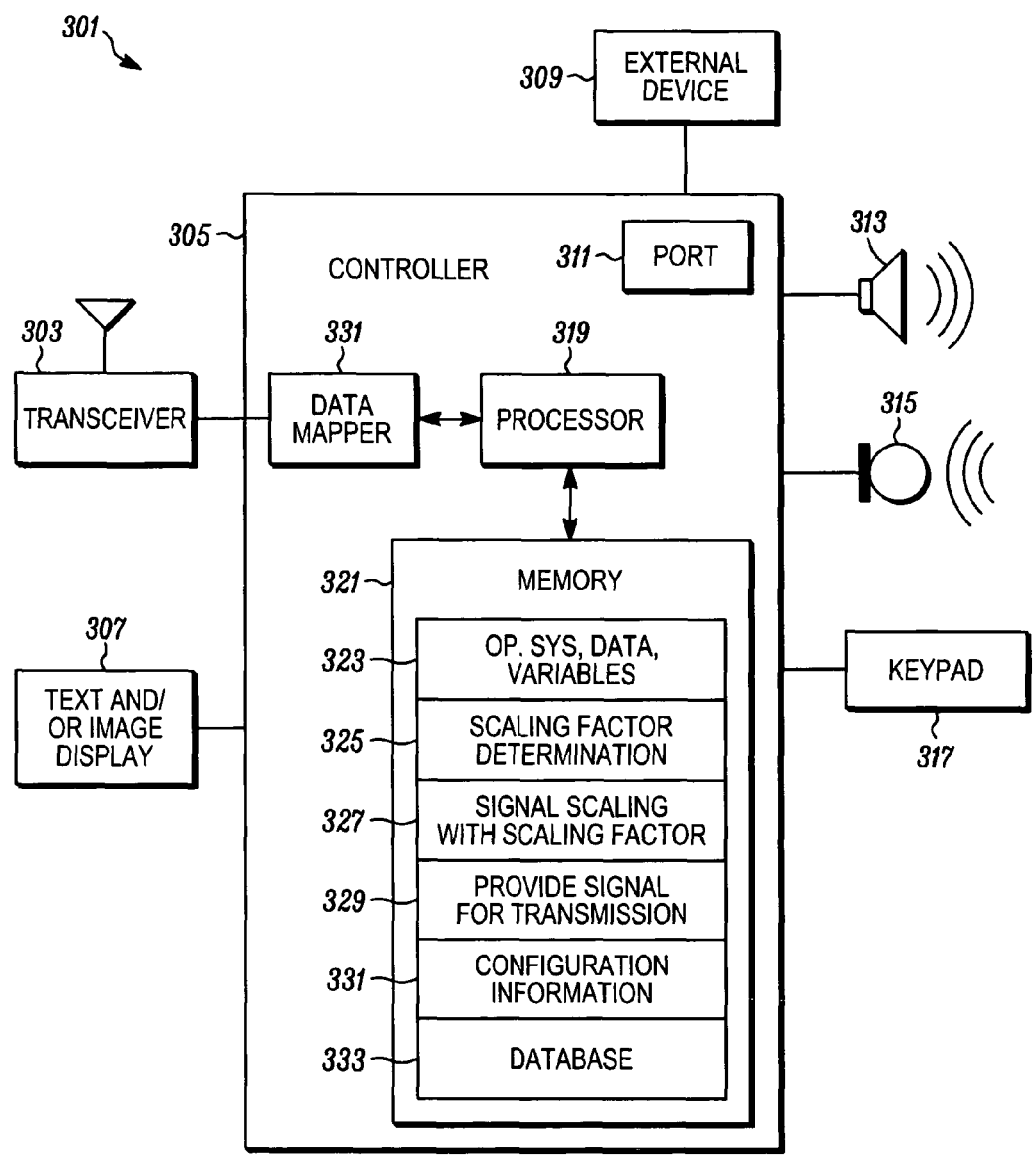
FIG. 3 is a block diagram illustrating portions of an exemplary communication unit in accordance with various exemplary embodiments.

Referring now to FIG. 3, a block diagram illustrating portions of an exemplary communication unit in accordance with various exemplary embodiments will be discussed and described. The communication device 301 may include a transceiver 303, a speaker 313, a microphone 315, a text and/or image display 307, and/or a user input device such as a keypad 317, and one or more controllers 305. The controller 305 may include a communication port 311 for communication with an external device 309, a processor 319, a data mapper 331, and a memory 321.

The processor 319 can comprise one or more microprocessors and/or one or more digital signal processors. The memory 321 can be coupled to the processor 319 and may comprise a read-only memory (ROM), a random-access memory (RAM), a programmable ROM (PROM), and/or an electrically erasable read-only memory (EEPROM). The memory 321 may include multiple memory locations for storing, among others, an operating system, data and variables 323 for programs executed by the processor 319; computer programs for causing the processor to operate in connection with various functions such as scaling factor determination 325, signal scaling with the scaling factor 327, providing a signal for transmission 329, and/or other processing; storage of configuration information 331; and a database 333 for other information used by the processor 319. The computer programs may be stored, for example, in ROM or PROM and direct the processor 319 in controlling the operation of the communication device 301.

The user can invoke functions accessible through the user input device, e.g., the keypad 317. The user input device may comprise one or more of various known input devices, such as a keypad, a computer mouse, a touchpad, a touch screen, a trackball, and/or a keyboard. The display (not illustrated) may present information to the user by way of a conventional liquid crystal display (LCD) or other visual display, and/or by way of a conventional audible device (e.g., the speaker 313) for playing out audible messages.

Responsive to signaling from the user, for example, from the microphone 315, from the user input device 317, etc. data can be prepared to be transmitted, in accordance with instructions stored in memory 321. The data can be prepared in accordance with known techniques into physical channels that are received by the data mapper 331. The data mapper 331 may be coupled to the processor 319 and the transceiver 303, e.g., via in-line components discussed above in detail that further transform the data into a signal appropriate for transmission.

Responsive to a message received from, e.g., a network infrastructure device, via the transceiver 303, configuration information 331 can be stored. Configuration information 331 can be changed as desired by the network infrastructure device transmitting appropriate messages, and can be stored for use by the processor 319 and the data mapper 331. For example, values stored in the configuration information 331 can be automatically utilized by the data mapper 331 and/or the processor.

The processor 319 can be programmed to provide a scaling factor determination 325, to provide signal scaling with the scaling factor 327, and to provide the signal for transmission 329. Scaling factor determination 325 can be responsive to the configuration information 331. The signal that is provided by the channels can be scaled utilizing the scaling factor. (Two or more exemplary embodiments of scaling the signal were discussed in connection with FIG. 1 and FIG. 2.) The processor 319 can further facilitate providing the signal directly or indirectly to the transmitter, e.g., in accordance with in-line components, in response to the scaling.

In one or more embodiments, referred to herein as first example technique, the data mapper 331 applies the Beta-gain values directly to their corresponding channels in accordance with normal conventions. The scaling factor can be applied to the signals output from the data mapper 331. The scaling factor can be computed as provided, for example, in the following illustration: define:

$\beta_{cnet}$ is the network signalled value of $\beta_c$
$\beta_{dnet}$ is the network signalled value of $\beta_d$
$\beta_{HSnet}$ is the network signalled value of $\beta_{HS}$
$\beta_{cmax}$ is the maximum allowed value of $\beta_{cnet}$
$\beta_{dmax}$ is the maximum allowed value of $\beta_{dnet}$
$\beta_{HSmax}$ is the maximum allowed value of $\beta_{HSnet}$ The maximum allowed values are defined in the present 3GPP specification as 15 for $\beta_{cmax}$ & $\beta_{dmax}$ and 30 for $\beta_{HSmax}$, although one can appreciate that the maximum allowed values may be adjusted according to one or more versions of various specifications which can be provided. In accordance with these definitions, the scaling factor can be computed by:

$$IQscale = \sqrt{\frac{\beta_{cmax}^2 + \beta_{dmax}^2 + \beta_{HSmax}^2}{\beta_{cnet}^2 + \beta_{dnet}^2 + \beta_{HSnet}^2}}$$

One or more alternative embodiments can provide that the Beta-gain values can be modified by the processor 319 prior to being applied to the channels in the data mapper 331, which for convenience is referred to as a second example technique. Consider an example where there are 6-bit beta values utilized in the data mapper, which will therefore have a maximum value of 63 decimal. For this example, the beta computations can be as follows:

$$\beta_c = \beta_{cnet} \times \frac{63}{\sqrt{\beta_{cnet}^2 + \beta_{dnet}^2 + \beta_{HSnet}^2}}$$

$$\beta_d = \beta_{dnet} \times \frac{63}{\sqrt{\beta_{cnet}^2 + \beta_{dnet}^2 + \beta_{HSnet}^2}}$$

$$\beta_{HS} = \beta_{HSnet} \times \frac{63}{\sqrt{\beta_{cnet}^2 + \beta_{dnet}^2 + \beta_{HSnet}^2}}$$

Known techniques provide that $\beta_c$, $\beta_d$ and $\beta_{HS}$ are the beta values that can be provided into the data mapper. In accordance with the first example technique, they are the same as $\beta_{cnet}$, $\beta_{dnet}$, and $\beta_{HSnet}$. In accordance with the second example technique, they are not.

Figure 4:
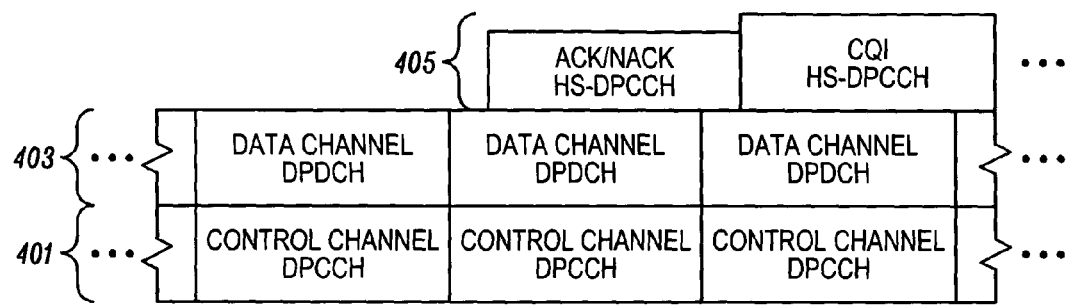
FIG. 4 is a diagram illustrating portions of exemplary communication channels comprising an exemplary signal.
Figure 5:
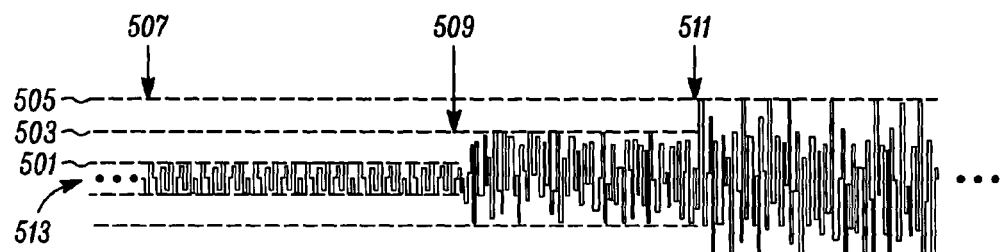
FIG. 5 is a diagram illustrating an amplitude of signals without scaling, corresponding to the signal described in connection with FIG. 4.
Figure 6:
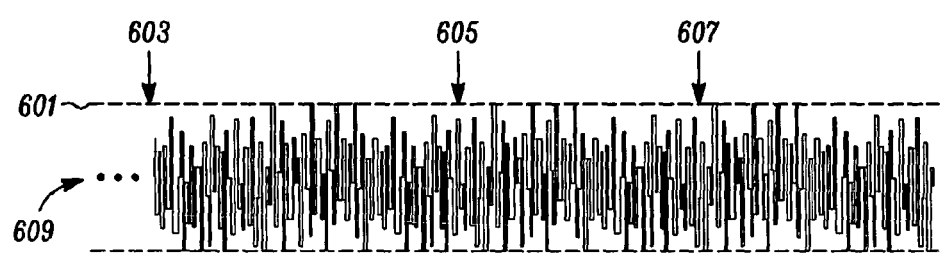
FIG. 6 is a diagram illustrating an amplitude of signals according to one or more embodiments, corresponding to the signal described in connection with FIG. 4.

FIG. 4, FIG. 5 and FIG. 6 together provide an example illustrating channel variation, including varying data and control information in varying channels comprising a signal; signal amplitude without scaling; and signal amplitude according to one or more embodiments. The data and channels illustrated in FIG. 4 correspond to the signals illustrated in FIG. 5 and FIG. 6. Together, these examples provide an illustration of how amplitude can vary in time as the channel configuration changes.

Referring now to FIG. 4, a diagram illustrating portions of exemplary communication channels comprising an exemplary signal will be discussed and described. The signal in this example includes three channels, e.g., a first channel 401, a second channel 403, and a third channel 405. In the present example, the first channel 401 corresponds to a control channel (e.g., a dedicated physical control channel "DPCCH"); the second channel 403 corresponds to a data channel (e.g., a dedicated physical data channel "DPDCH"); and the third channel 405 corresponds to a high speed dedicated physical control channel ("HS-DPCCH"). In this example, the control channel 401 and the data channel 403 each have a fixed Beta-gain, here represented by a fixed height of a communication block. The configuration information, e.g., the number of channels and the weighting of each channel, has been previously determined, e.g., by a network infrastructure device. The configuration can be changed. The effect of this is explored in the following section.

For example, the network infrastructure can initially indicate that there are two channels, the first channel 401 and the second channel 403. Later, the network infrastructure can indicate that there are three channels, e.g., including the third channel 405. In this example, however, the HS-DPCCH channel 405 has a variable Beta-gain, illustrated by a variable height of a communication block. As illustrated, some types of data on the HS-DPCCH channel 405 can have a particular Beta-gain which is lower, e.g., an ACK/NACK (acknowledge/negative acknowledge) signal, while other signals can have a particular Beta-gain which is higher, e.g., a CQI (channel quality indicator) signal.

Referring now to FIG. 5, a diagram illustrating an amplitude of signals without scaling, corresponding to the signal described in connection with FIG. 4, will be discussed and described. A signal 513 has a first amplitude 501 when the signal includes the data channel and the control channel with a fixed Beta-gain, beginning in this example at a first time 507. At a second time 509, a third channel is added to the configuration and hence to the signal 513, and the signal then has a second amplitude 503 larger than the first amplitude 501. In this example, the third channel is variable, and at a third time 511 the data on the third signal has an increased weighting. Consequently, the signal increases to a third amplitude 505 larger than the second amplitude 503.

Referring now to FIG. 6, a diagram illustrating an amplitude of signals according to one or more embodiments, corresponding to the signal described in connection with FIG. 4, will be discussed and described. Here, the signal has been scaled in accordance with one or more embodiments. A signal 609 has a first amplitude 601 when the signal is configured to include the data channel and the control channel with a fixed Beta-gain, beginning in this example at a first time 603. At a second time 605, a third channel is added to the configuration and hence to the signal 609. The signal is scaled according to the channel configuration, including e.g., the number of channels, as explained in detail previously. Consequently, the signal 609 continues to have an amplitude substantially the same as the first amplitude 601. As described above, the third channel of this example has a weighting that varies according to the data on the channel, and hence experiences a variation and at a third time 607 when the Beta-gain corresponding to data on the third signal increases. The signal is again scaled according to the channel configuration, including e.g., the amplitude (e.g., Beta-gain) of signals on the channels, as explained in detail previously. Consequently, the signal 609 maintains substantially the same amplitude 601 as before. Although the signal initially had a smaller amplitude, in accordance with one or more embodiments it will operate the majority of the time with levels that can be closer to the maximum that can be supported in the in-line components, advantageously without clipping.

Figure 7:
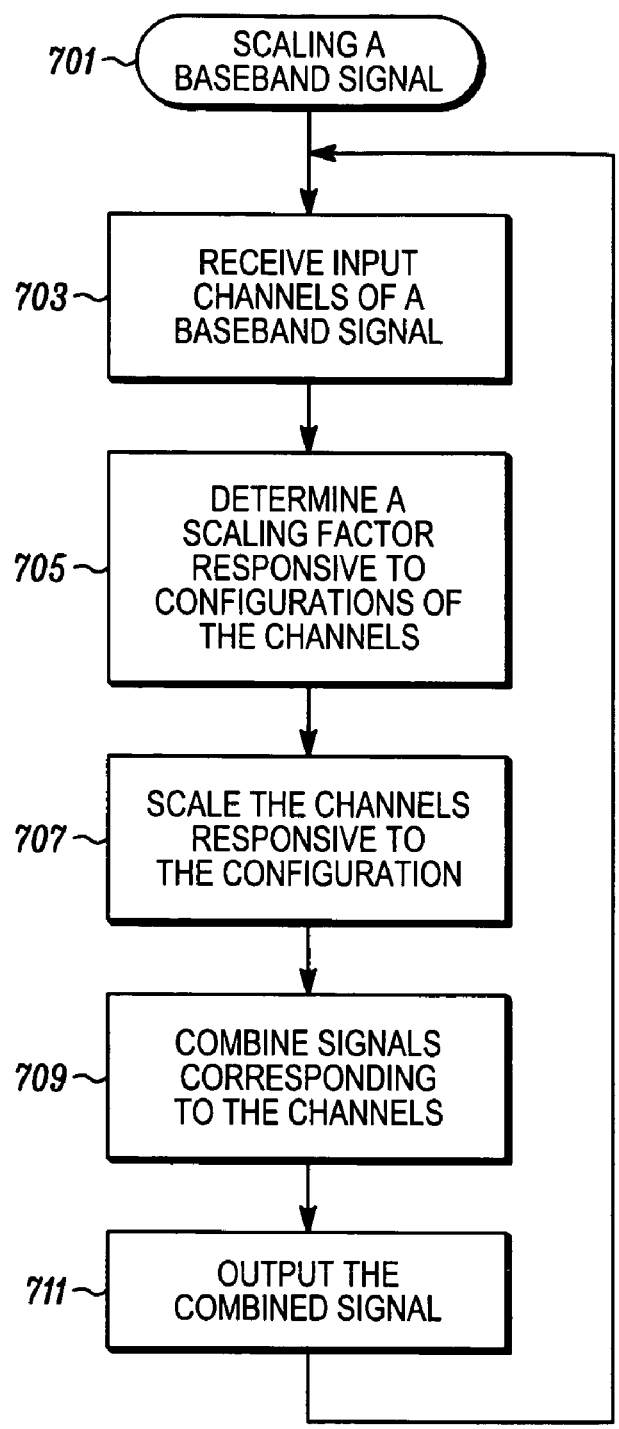
FIG. 7 is a flow chart illustrating an exemplary procedure for scaling a signal in accordance with various exemplary and alternative exemplary embodiments.

Referring now to FIG. 7, a flow chart illustrating an exemplary procedure for scaling 701 a signal in accordance with various exemplary and alternative exemplary embodiments will be discussed and described. The procedure can advantageously be implemented on, for example, a processor of a controller, described in connection with FIG. 3 or other apparatus appropriately arranged.

Input channels of a signal are received 703. The channels can be physical channels of a signal, where each physical channel can have a different configuration. A scaling factor is determined, responsive to the configurations of the channels 705. The channels can be scaled, where the scaling is responsive to the configuration 707. Further, the signals can be combined corresponding to the channels 709. For example, an in-phase signal and a quadrature signal can be provided in response to the scaling, and these signals can be further combined, e.g., as described previously. The combined signal can then be output 711, to provide an output signal. The process can repeat continuously.

The scaling factor that is utilized in the scaling can be determined, e.g., responsive to the different configurations of one or more respective physical channels. The different configurations can include, e.g., a weighting of the respective physical channels. More particularly, the weighting can include a Beta-gain associated with the respective channel.

The different configurations can be changed, e.g., by changing the number of channels and/or a weighting and/or variability of one or more channels. The scaling can be repeated in various ways. For example, one or more embodiments provide that the scaling is continuously determined from the stored configuration information. Alternative exemplary embodiments provide that the scaling is determined at least when the configuration information is changed.

The communication systems and communication units of particular interest are those providing or facilitating voice communications services or data or messaging services over cellular wide area networks (WANs), such as conventional two way systems and devices, various cellular phone systems including digital cellular, CDMA (code division multiple access) and variants thereof, WCDMA (wideband CDMA) and variants thereof, GSM (Global System for Mobile Communications), GPRS (General Packet Radio System), 2.5G and 3G systems such as UMTS (Universal Mobile Telecommunication Service) systems, Internet Protocol (IP) Wireless Wide Area Networks like 802.16, 802.20 or Flarion, integrated digital enhanced networks and variants or evolutions thereof.

Furthermore the wireless communication units or devices of interest may have short range wireless communications capability normally referred to as WLAN (wireless local area network) capabilities, such as IEEE 802.11, Bluetooth, or Hiper-Lan and the like preferably using CDMA, frequency hopping, OFDM (orthogonal frequency division multiplexing) or TDMA (Time Division Multiple Access) access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively the wireless communication units or devices of interest may be connected to a LAN using protocols such as TCP/IP, UDP/UP, IPX/SPX, or Net BIOS via a hardwired interface such as a cable and/or a connector.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A communication unit comprising:
   a transmitter;
   a processor, configured to facilitate receiving information representative of a configuration for a plurality of channels; determining whether a scaling factor is to be applied; determining the scaling factor responsive to the configuration for producing a signal having a substantially constant amplitude; scaling the signal provided by a combination of the plurality of channels utilizing the scaling factor; and providing the signal to the transmitter, responsive to the scaling, wherein the scaling factor results in the signal, as scaled, having the substantially constant amplitude, and
   a data mapper receiving the plurality of channels, and outputting the signal, wherein the scaling is performed in the data mapper,
   wherein the configuration includes a number of channels, and a weighting of channels.

2. A communication unit comprising:
   a transmitter;
   a processor, configured to facilitate receiving information representative of a configuration for a plurality of channels; determining a scaling factor responsive to the configuration; scaling a signal provided by a combination of the plurality of channels utilizing the scaling factor; and providing the signal to the transmitter, responsive to the scaling;
   a data mapper receiving the plurality of channels and outputting the signal;
   an in-phase scale multiplier; and
   a quadrature scale multiplier;
   wherein the scaling is performed in the in-phase scale multiplier and the quadrature scale multiplier, and
   wherein the signal, as scaled, has a substantially constant amplitude.

3. The communication unit of claim 2, wherein the configuration includes a number of channels, and a weighting of channels.

4. The communication unit of claim 3, wherein a weighting of at least one channel of the plurality of channels is responsive to a type of message on the at least one channel.

5. The communication unit of claim 2, wherein each channel of the plurality of channels can have a different configuration.

6. The communication unit of claim 2, wherein the processor is configured to facilitate determining the configuration, and to facilitate re-determining the scaling factor.

7. The communication unit of claim 2, wherein the configuration includes a weighting corresponding to each channel of the plurality of channels.

8. A modulator, comprising:
a data mapper, configured to facilitate receiving a plurality of physical channels, wherein an amplitude of the respective physical channels can differ; combine the plurality of physical channels to form a signal; adjust the signal responsive to a scaling factor to provide an adjusted signal having a substantially constant signal level that is independent of the plurality of physical channels; and output the adjusted signal to a transmitter; and
a processor, configured to: facilitate determining a configuration of the plurality of physical channels; determining whether the scaling factor is to be applied; compute the scaling factor responsive to the configuration; and apply the scaling factor to the signal,
wherein the configuration includes a number of channels, and a weighting of channels, and
wherein the transmitter transmits the signal at a substantially constant transmit level for a first configuration and for a different configuration of the plurality of physical channels.

9. The modulator of claim 8, wherein the scaling factor is responsive to a beta gain of the physical channels.

10. The modulator of claim 9, wherein at least one of the physical channels has a variable beta gain.

11. The modulator of claim 8, wherein the scaling factor is responsive to an in-phase and quadrature (IQ) scale multiplier.

12. A method of scaling a signal under different channel configurations, comprising:
inputting a plurality of physical channels of a signal, wherein each physical channel of the plurality of physical channels can have a different configuration;
scaling the plurality of physical channels, wherein the scaling is responsive to a configuration including a number of channels, and a weighting of respective physical channels;
providing, responsive to the scaling, an in-phase signal and a quadrature signal, the in-phase signal and the quadrature signal being a combination of the plurality of physical channels as scaled;
performing pulse shaping and interpolation on the in-phase signal and the quadrature signal; and
combining the in-phase signal and the quadrature signal to provide an output signal, the output signal coupled to a transmitter at a substantially constant amplitude,
wherein the transmitter transmits the output signal at a substantially constant transmit level for a first configuration and for a different configuration of the plurality of physical channels.

13. The method of claim 12, further comprising determining a scaling factor to utilize in the scaling, wherein the scaling factor is determined utilizing the different configuration of the each physical channel.

14. The method of claim 13 wherein the weighting of respective physical channels is determined by an amplitude of at least one respective physical channel.

15. The method of claim 12, wherein the different configuration includes a weighting of a high speed dedicated physical control channel.

16. The method of claim 12, wherein the weighting of a respective physical channel is determined by a beta gain associated therewith.

17. The method of claim 12, further comprising changing the different configuration of at least one physical channel of the physical channels, and repeating the scaling.

* * * * *